(12) United States Patent
Drzal et al.

(10) Patent No.: US 11,660,846 B2
(45) Date of Patent: May 30, 2023

(54) COMPOSITE ARTICLE AND METHOD OF MANUFACTURE

(71) Applicant: Board of Trustees of Michigan State University, East Lansing, MI (US)

(72) Inventors: Lawrence T. Drzal, Okemos, MI (US); Mahmoodul Haq, Lansing, MI (US)

(73) Assignee: BOARD OF TRUSTEES OF MICHIGAN STATE UNIVERSITY, East Lansing, MI (US)

( * ) Notice: Subject to any disclaimer, the term of this patent is extended or adjusted under 35 U.S.C. 154(b) by 160 days.

(21) Appl. No.: 15/569,989

(22) PCT Filed: Apr. 29, 2016

(86) PCT No.: PCT/US2016/030132
§ 371 (c)(1),
(2) Date: Oct. 27, 2017

(87) PCT Pub. No.: WO2017/014821
PCT Pub. Date: Jan. 26, 2017

(65) Prior Publication Data
US 2018/0304598 A1    Oct. 25, 2018

Related U.S. Application Data

(60) Provisional application No. 62/154,845, filed on Apr. 30, 2015.

(51) Int. Cl.
*B32B 27/20* (2006.01)
*B32B 27/08* (2006.01)
(Continued)

(52) U.S. Cl.
CPC ............. *B32B 27/20* (2013.01); *A42B 3/063* (2013.01); *B32B 27/08* (2013.01); *F41H 1/04* (2013.01);
(Continued)

(58) Field of Classification Search
CPC .......... B32B 2264/108; B32B 2250/42; B32B 27/12; B32B 2250/05; B32B 27/08;
(Continued)

(56) References Cited

U.S. PATENT DOCUMENTS

2010/0098925 A1    4/2010   Fasulo et al.
2011/0143619 A1 *  6/2011   Luinge .................... B32B 27/12
                                                    442/59

(Continued)

FOREIGN PATENT DOCUMENTS

CN    202032946 U        11/2011
KR    101483282 B1 *     1/2015
(Continued)

OTHER PUBLICATIONS

Machine translation of KR101483282, published Jan. 2015. (Year: 2015).*

(Continued)

*Primary Examiner* — Monique R Jackson
(74) *Attorney, Agent, or Firm* — Marshall, Gerstein & Borun LLP

(57) ABSTRACT

A multilayer composite includes adjacent filler layers having a filler material dispersed within a first polymeric matrix and an intervening-layer disposed between the adjacent filler layers. The intervening-layer comprises nanoplatelets embedded within a second polymeric matrix and are aligned substantially parallel to the adjacent filler layers. The intervening-layer is configured to fail upon application of a force to the multilayer composite that is greater than or equal to a predetermined force threshold.

20 Claims, 8 Drawing Sheets

(51) Int. Cl.
 *A42B 3/06* (2006.01)
 *F41H 5/04* (2006.01)
 *F41H 1/04* (2006.01)
 *F41H 1/08* (2006.01)
 *A42B 3/20* (2006.01)

(52) U.S. Cl.
 CPC ............. *F41H 1/08* (2013.01); *F41H 5/04* (2013.01); *A42B 3/20* (2013.01); *B32B 2250/42* (2013.01); *B32B 2437/04* (2013.01); *B32B 2571/02* (2013.01)

(58) Field of Classification Search
 CPC .......... B32B 27/20; B32B 2264/201; B32B 2437/04; B32B 2571/02; A42B 3/063; A42B 3/20
 See application file for complete search history.

(56) References Cited

U.S. PATENT DOCUMENTS

| | | | | |
|---|---|---|---|---|
| 2011/0186685 | A1* | 8/2011 | Tsotsis | F15D 1/12 428/167 |
| 2011/0212320 | A1* | 9/2011 | Greenhill | A42B 3/12 428/313.3 |
| 2011/0250427 | A1 | 10/2011 | Kotov et al. | |
| 2012/0186742 | A1 | 7/2012 | Kang et al. | |
| 2012/0204327 | A1 | 8/2012 | Faden et al. | |
| 2012/0204329 | A1 | 8/2012 | Faden et al. | |
| 2012/0207964 | A1 | 8/2012 | Faden et al. | |
| 2012/0208032 | A1 | 8/2012 | Faden et al. | |
| 2012/0296012 | A1* | 11/2012 | Palmese | C08G 59/4021 523/400 |
| 2013/0273273 | A1* | 10/2013 | Greenhill | B32B 27/14 428/34.1 |
| 2013/0316159 | A1* | 11/2013 | Tsumura | B29C 48/71 428/216 |
| 2013/0323473 | A1* | 12/2013 | Dietsch | B29C 64/153 427/407.1 |
| 2013/0340147 | A1 | 12/2013 | Giles | |
| 2014/0023805 | A1 | 1/2014 | Greenhill et al. | |
| 2014/0113086 | A1 | 4/2014 | Greenhill et al. | |
| 2015/0337105 | A1* | 11/2015 | Takahashi | B32B 7/02 428/213 |
| 2016/0090469 | A1* | 3/2016 | Mapkar | C08K 7/00 252/75 |
| 2017/0129207 | A1* | 5/2017 | Hallander | B82Y 30/00 |
| 2018/0354785 | A1* | 12/2018 | Kinloch | B82Y 30/00 |

FOREIGN PATENT DOCUMENTS

| | | |
|---|---|---|
| WO | 2008094603 A1 | 8/2008 |
| WO | 2014040704 A2 | 3/2014 |
| WO | WO-2014087883 A1 * | 6/2014 |
| WO | 2014114915 A1 | 7/2014 |

OTHER PUBLICATIONS

European Patent Application No. 16828166.5, Extended European Search Report, dated Nov. 22, 2018.
International Search Report for related WO Application No. PCT/US2016/030132, dated Mar. 13, 2017.

* cited by examiner

1

COMPOSITE ARTICLE AND METHOD OF MANUFACTURE

This invention was made with government support under Contract No. ARL CA #W911NF-11-2-0017 awarded by the U.S. Army Research Lab. The government has certain rights in the invention.

CROSS REFERENCE TO RELATED APPLICATIONS

The present application is the National Stage application claiming benefit of International Patent Application No. PCT/US2016/030132, filed Apr. 29, 2016, which claims the benefit of U.S. Provisional Patent Application No. 62/154,845, filed Apr. 30, 2015, each of the contents of which are incorporated herein by reference in their entirety.

TECHNICAL FIELD

The embodiments of the present invention generally relates to a composite article and to a method of deflecting a force translated to an article through an impact and an article for deflecting an impact force. More specifically, the embodiments of the present invention relate to the use of nanoparticles to deflect force translated to any article subject to an impact force.

DESCRIPTION OF THE RELATED ART

There are a multitude of scenarios in which the ability to protect an object from an impact source is desirable. For example, the ability to protect parts of the human body from an impact force is important in areas such as athletics, military and security, and occupational safety. Consider the specific example of head protection in athletics, particularly football. Debate regarding the health effects of concussions on football players has caused considerable controversy. Concussions and other types of play-related traumatic brain injuries have been proposed as a major cause of player suicides and other symptoms after retirement including memory loss, depression and chronic traumatic encephalopathy (CTE).

The list of ex-football players that have either presented post-mortem with CTE, or otherwise have either reported symptoms or been diagnosed with CTE, continues to grow. These issues are not limited to just the National Football League (NFL) or other professional leagues, since concussions and other types of play-related traumatic brain injuries can occur at any level of the sport, including in arena, recreational, college, high school, junior high, or even youth leagues. For example, football led to more concussions than any other high school sport in the 2013-2014 school year.

Doctors have determined that a g-force in the mid- to high 90s will increase the risk of a concussion, even though a professional quarterback that gets sacked would typically experience a g-force approaching 150. All players on the field are at risk for concussion, regardless of their position. Accordingly, numerous efforts have been attempted to prevent concussions and their consequences.

Since 2003, Riddell has utilized its Head Impact Telemetry System (HITS) and Sideline Response System (SRS) to help record the frequency and severity of player impacts during practices and games. Over 1.8 million points of impact have been recorded. Every HITS helmet features MX Encoders, which automatically records every hit. When the system detects a Suspect Impact Profile (SIP) for a particular player, an alarm page alerts medical or training staff.

In 2008, a device known as the "Shockometer" (by Schutt Sports) was used during the Arena Football League's season. The Shockometer is a triangle-shaped object with adhesive on its side that sticks to a player's helmet. When the player gets hit by a g-force exceeding 98, a capsule in the Shockometer will change from green to red. Unfortunately, the Shockometer was extremely cost prohibitive with a cost of $1000 per unit. Since this time, other companies including Reebok, mc10, and Battle Sports have developed similar devices. For example, Reebok developed the Head impact Indicator in 2013, which is a quarter-sized device placed on a player's skull, which activates a red/yellow light if the player is hit too hard.

Other than monitoring impacts, various attempts have been made to modify helmet designs to reduce kinetic energy transmission to individuals. For example, Kinetica Inc. has a number of patent application publications directed toward different helmet designs including U.S. Pub. Nos.: 2012/0208032, which describes a helmet having first and second layers that displace in response to an applied shearing force (i.e., outer slip layers), and a third layer that does not displace in response to the applied shearing force; 2012/0204329, which describes a helmet utilizing fluid-filled containers; 2012/0207964, which describes a helmet utilizing foam structures having graded properties; and 2012/0204327, which describes a helmet utilizing nanocomposites.

Another example of helmet modification is described in U.S. Pub. No. 2013/0340147 to Giles. The Giles' publication is directed toward a helmet comprising a series of linked coils and filler material. Other composite helmets have also been proposed, primarily directed toward military/ballistic applications, such as those described in U.S. Pub. No. 2012/0186742, directed toward use of boron nitride nanotubes; and those associated with Greenhill AntiBallistics Corporation's gradient nanoparticle-carbon allotrope polymer composites, which are described in U.S. Pub Nos. 2013/027273, 2014/0023805, and 2014/0113086.

Unfortunately, the aforementioned devices/systems merely monitor or identify when a player has experienced a concussive impact. Quite simply, the aforementioned devices/systems offer no protection against an injury or its consequences. Instead, they merely indicate when a player should be pulled from play, be monitored, or seek medical attention. As for the aforementioned helmets, many of them are overly complex and directed toward impacts different from those experienced during football, e.g. impacts experienced during combat/warfare or vehicular accidents. Further, many of these devices and helmets are cost prohibitive, especially for non-professional athletes or leagues. In addition, many of these helmets must be replaced outright after being subject to a significant impact event, i.e., they are not repairable.

In view of the foregoing, there remains an opportunity to provide methods for deflecting a force translated to an article through an impact and to provide improved composite articles that can be used to deflect a force translated to the article through an impact.

BRIEF SUMMARY

According to one embodiment, a multilayer composite comprises adjacent filler layers comprising a filler material dispersed within a first polymeric matrix and an intervening-layer disposed between the adjacent filler layers, said intervening-layer comprising nanoplatelets embedded within a second polymeric matrix. The nanoplatelets are aligned substantially parallel to the adjacent filler layers and the intervening-layer is configured to fail upon application of a force to the multilayer composite that is greater than or equal to a predetermined force threshold, said failure inducing at least partial delamination of the multilayer composite.

In yet another embodiment, the multilayer composite comprises a plurality of adjacent filler layers and a plurality of intervening-layers, wherein at least one of the plurality of intervening-layers is disposed between each of the adjacent filler layers. At least one of the plurality of intervening-layers is configured to fail at a different predetermined force threshold than the other of the plurality of intervening-layers. At least one of an amount of nanoplatelets, an average thickness of the nanoplatelets, an average aspect ratio of the platelets, and a thickness of at least one of the plurality of intervening-layers can be different than the other of the plurality of intervening-layers. All of said plurality of adjacent filler layers can be free of nanoplatelets.

In still other embodiments, the nanoplatelets can have the following features alone or in combination: an average thickness of less than 10 nanometers; an average aspect ratio of at least 100; a presence within a range of 0.1 to 10 parts by weight; and/or a presence within a layer having a thickness within a range of 0.025 to 2.5 millimeters.

In another embodiment, the filler material comprises at least one of carbon fibers, boron fibers, glass fibers, silicon carbide fibers, ceramic fibers, aramid fibers, talc, calcium carbonate, powdered minerals, mica, cellulose fibers, or glass spheres.

In yet another embodiment, the first polymeric matrix and the second polymeric matrix comprise a thermoplastic or a thermoset resin. In one embodiment, the first polymeric matrix is different than the second polymeric matrix.

In still another embodiment, a piece of protective body gear comprises the multilayer composite article as set forth herein.

In another embodiment, a method of deflecting force translated to an article through an impact, comprises the steps of providing a carrier layer of material including nanoplatelets suspended therein, with the nanoplatelets including a central portion and a periphery, orienting the nanoplatelets in a first layer of nanoplatelets and a second layer of nanoplatelets disposed in a generally parallel relationship with the nanoplatelets disposed in the first layer being oriented in an overlapping relationship with the nanoplatelets disposed in the second layer such that the periphery of the nanoplatelets disposed in the first layer overlap the central portion of the nanoplatelets disposed in the second layer, and deflecting a force impacting the central portion of the nanoplatelets disposed in the first layer to the central portion of the nanoplatelets in the second layer, thereby creating a tortuous path for the force translating through the article generated by the impact.

In other embodiments, the method further includes the step of providing a plurality of carrier layers of material. The step of providing a plurality of carrier layers of material can be further defined by the carrier layers of material including decreasing amounts of nanoplatelets disposed therein in a direction extending away from the force generated by the impact.

In yet another embodiment, further including the step of at least partial delamination within the carrier layer of material upon the deflecting of a force impacting the article.

In other embodiments, the method further includes the step of the carrier layer of material absorbing force translated to the article from the impact.

In another embodiment, the step of orienting the nanoplatelets is further defined by orienting the nanoplatelets with rheological force. In yet another embodiment, the step of providing a carrier layer of material including nanoplatelets is further defined by providing nanoplatelets having an average aspect ratio of at least 100.

In other embodiments, the carrier layer of material can comprise an intervening-layer disposed between adjacent layers comprising a filler material dispersed within a polymeric matrix. In still other embodiments, the carrier layer of material can comprise an intervening-layer disposed between adjacent layers comprising a filler material dispersed within a polymeric matrix.

BRIEF DESCRIPTION OF THE DRAWINGS

Other advantages of the disclosure will be readily appreciated, as the same becomes better understood by reference to the following detailed description when considered in connection with the accompanying drawings wherein.

DETAILED DESCRIPTION

Disclosed is a composite article. A method of making the composite article is also disclosed. The composite article is described below and the method is described further below. Unless otherwise specifically indicated in the disclosure that follows, the drawings are not drawn to scale.

Composite Article

Referring to the Figures, wherein like numerals indicate like parts throughout the several views, the composite article (hereinafter "composite") is shown generally at 20. The composite 20 is can be used for various applications. The composite 20 is most useful for applications where energy deflection, spreading, or otherwise reduction of kinetic energy is desired, in particular the composite 20 is useful for deflecting a force translated to the composite 20 through an impact. For example, the composite 20 can be used to lessen the amount of kinetic energy experienced by an athlete, e.g. a football player, while being struck by another player or object, e.g. a hockey puck. The composite 20 can also benefit defense or security personnel, who may be struck with blunt objects, bullets, or shrapnel. Additional aspects and advantages of the composite 20 are described further below.

Figure 1:
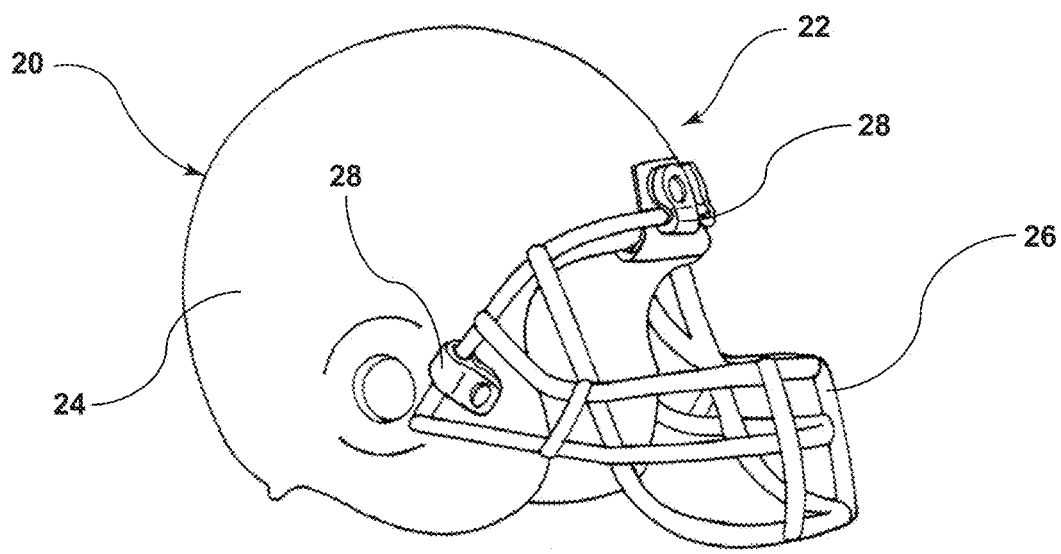
FIG. 1 is a perspective view of a football helmet including a shell, face mask, and clips.

In FIG. 1, a football helmet 22 (hereinafter "helmet 22") is shown. The helmet 22 includes a shell 24, face mask 26, and clips 28 for securing the face mask 26 to the shell 24. While not shown, the helmet 22 may also include any number of other conventional helmet features, such as ventilation holes/vents, padding, a chinstrap/cup, buckles/straps, a visor, paint, indicia, impact sensors/monitors, a communication device, etc. This disclosure is not limited to a particular configuration of the helmet 22, Further, other types of helmets 22 are also contemplated, such as helmets 22 used in other types of sports (e.g. baseball or hockey), as well as helmets 22 used for defense (e.g. by police, fire, security, or military personnel), vehicular applications (e.g. watercraft, aircraft, or land craft riders/occupants), and for industrial, manufacturing, or construction applications. In some instances, the helmet 22 may be referred to as a hardhat. While the embodiments of the invention are described in the context of a helmet, it will be understood that the embodiments of the invention can be used with any type of article that provides support for or protection to an object, including shoes, impact areas of vehicles, and any article subject to forces generated by an impact. While helmets are discussed throughout this application, it should be understood that all of these articles are within the scope of the invention.

Figure 2:
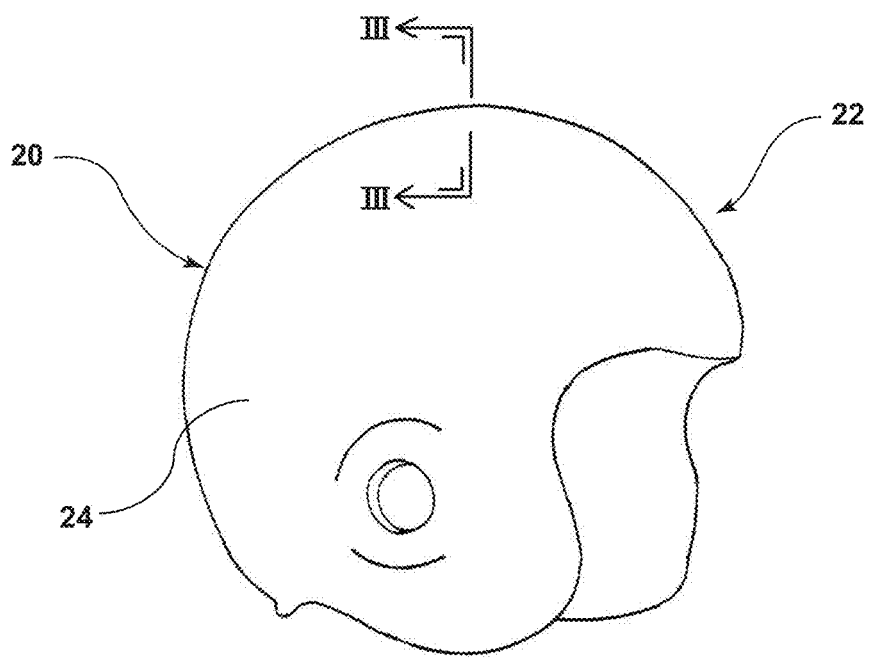
FIG. 2 is a perspective view of the football helmet of FIG. 1 with the face mask and clips removed from the shell.

The shell 24, which is better illustrated in FIG. 2, generally comprises the composite 20. In further embodiments, the shell 24 may consist essentially of, or consist of, the composite 20 so that other composites are considered within the scope of the invention. While not shown, the shell 24 may also include one or more substrate layers, one or more outer layers, or combinations thereof. A conventional helmet typically has a shell surrounding a foamed substrate (e.g. padding). Polycarbonate (PC) is a common type of thermoplastic used for such shells, but other types of thermoplastics are also suitable. Further, urethane and/or Styrofoam are common types of foam used for such foamed substrates, but other types of foams are also suitable. The helmet 22 can mimic any type or configuration of conventional helmet, but for the composite 20 of this disclosure also being present in addition to any other features.

In various embodiments, the composite 20 is an outermost (or near outermost) layer of the helmet 22. In these embodiments, the composite 20 is similar to "ProCap", which is manufactured by Protective Sports Equipment, Inc. ProCap is a half-inch thick urethane foam mold that can be worn atop a conventional football helmet. The composite 20 can be applied/affixed to the shell of a conventional helmet in a similar manner and serve, for example, as a sacrificial padding layer. This concept can also be used for retrofitting other types of helmets, such as military helmets having aramid fibers and/or metal shell (as opposed to a thermoplastic shell in a sport helmet, for example). The composite 20 may be attached to the shell by various means, e.g. by an adhesive, hook-and-loop fasteners, snaps, etc. The composite 20 may be painted, include indicia, or otherwise be decorated (not shown). The composite 20 may also include sensors, either embedded within composite 20, or mounted outside, or a combination of both for identifying impact energy.

In other embodiments, the composite 20 is the shell 24 of the helmet 22. This is common when the helmet 22 is made from scratch, rather than when an old/prior helmet is retrofitted with the composite 20. In these embodiments, the composite 20 can be internally and/or externally reinforced with a semi-rigid or rigid substrate or similar support structure (not shown). The support structure may be a thermoplastic shell/layer, matrix, etc. A foamed substrate can be attached under the support structure, as conventionally utilized in helmets. In these embodiments, a skin (not shown) may be applied atop the composite 20 for purposes of protection, decoration, etc.; however, the skin is not required.

Figure 3:
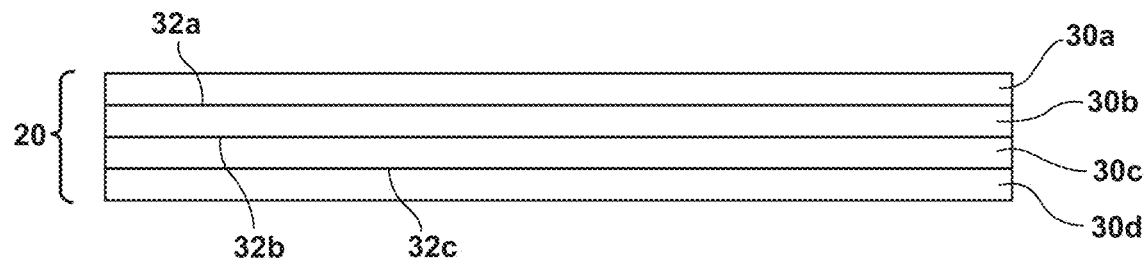
FIG. 3 is a cross-sectional side view taken along line 3-3 of FIG. 2 illustrating a composite article of this disclosure.

In one embodiment, the composite 20 includes a first layer 30a, a second layer 30b adjacent the first layer 30a, and an intervening-layer 32 disposed between the first and second layers 30. The first and second layers 30, and optionally, one or more additional layers 30 described below, are collectively referred to herein as "the layers 30". Because the layers 30 typically include a filler material, as described in more detail below, the layers 30 are also referred to herein as "filled layers". The intervening-layer 32, and optionally, one or more additional intervening-layers 32 described below, are collectively referred to herein as "the intervening-layers 32". The intervening-layers 32 may also be referred to in the art as tie-layers. The composite 20 can have any number of layers 30 and corresponding intervening-layers 32, typically oriented in series with an intervening-layer 32 sandwiched between two layers 30 and so on in a repeating fashion. The layers 30 and corresponding intervening-layers 32 can be in direct contact or spaced from each other, e.g. via an additional intervening-layer (not shown). Typically the layers 30 and intervening-layers 32 are in direct contact with each other as like depicted in FIG. 3.

Referring to the embodiments shown in FIGS. 3 through 7, the composites 20 have multiple layers 30 and multiple intervening-layers 32. The composites 20 shown in FIGS. 3, 4, and 5 each include four layers 30 and three intervening-layers 32. Specifically, these composites 20 each include a first layer 30a, second layer 30b, third layer 30c, and fourth layer 30d, as well as a first intervening-layer 32a, second intervening-layer 32b, and third intervening-layer 32c.

Figure 6:
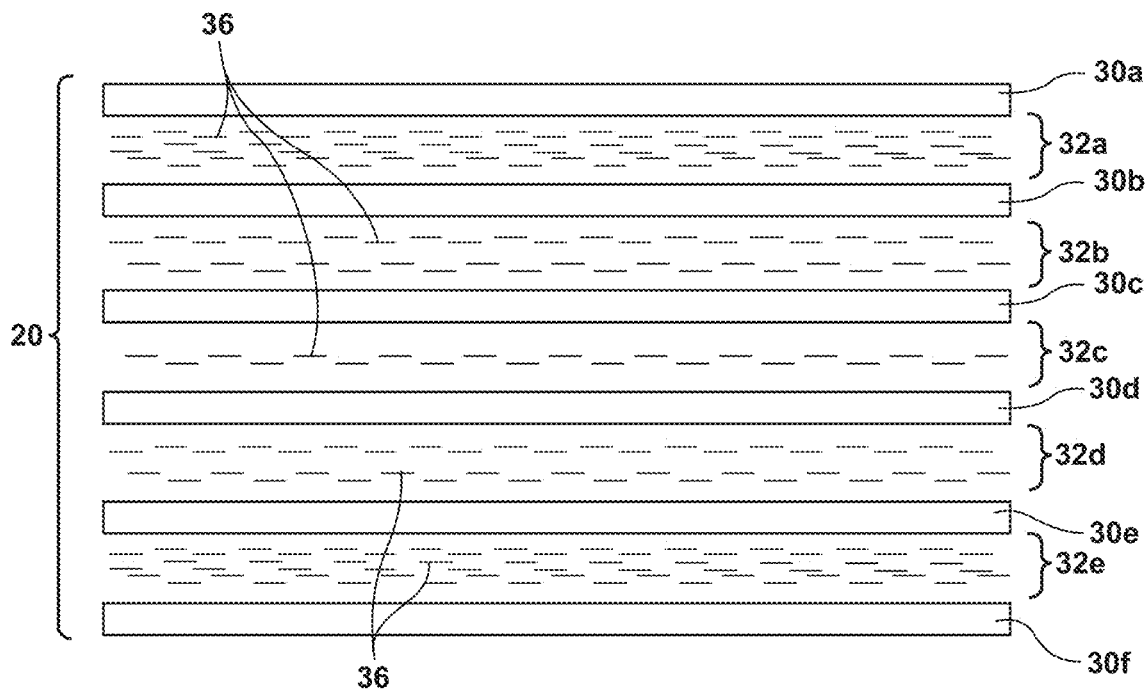
FIG. 6 is an exploded side view of another embodiment of the composite article.
Figure 7:
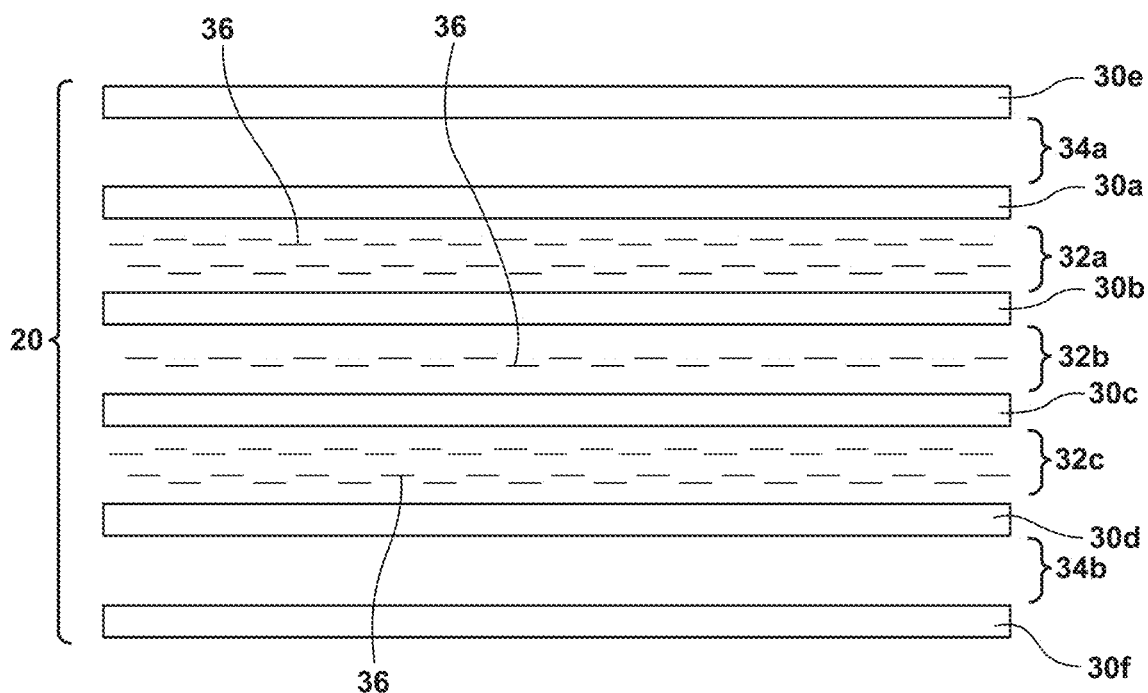
FIG. 7 is an exploded side view of yet another embodiment of the composite article.

The composites 20 shown in FIGS. 6 and 7 each include six layers 30. These composites 20 are similar to the composites 20 above, but further include a fifth layer 30e and a sixth layer 30f. The composite 20 shown in FIG. 6 further includes a fourth intervening-layer 32d and a fifth intervening-layer 32e.

The composite 20 shown in FIG. 7 further includes a first resin layer 34a and a second resin layer 34b spaced from the first resin layer 34a. The resin layers 34 may also be referred to in the art as adhesive glue layers. The resin layers 34 individually comprise a polymeric matrix (described further below), typically individually consist essentially of the polymeric matrix, and more typically individually consist of the polymeric matrix. Layers 30e and 30f are different from typical layers 30, as they are not directly associated with an intervening-layer 32 but rather a resin layer 34. The composite 20 of this disclosure is not limited to just the embodiments depicted in the Figures and can include various numbers, combinations, and orientations of the layers 30, intervening-layers 32, and optional resin layers 34.

The first layer 30a can comprise a filler material within a resin matrix. The second layer 30b also comprises a filler material within a resin matrix. Any additional layers 30, if present, also comprise a filler material within a resin matrix. Because many filler materials provide reinforcement to the resin matrix, the filler materials can also be referred to as reinforcement materials. The filler material can include fibers, particles, or combinations thereof. In the exemplary embodiment described herein, the filler material can be in the form of natural and/or synthetic fibers. The filler material can be selected based on the resin matrix to be used, the desired characteristics of the composite 20, and its intended use. The fibers of the second layer 30b, and/or any additional layer 30, may be the same as or different from the fibers of the first layer 30a. Likewise, the resin of the second layer 30b, and/or any additional layer 30, may be the same as or different from the resin of the first layer 30a. Typically, the layers 30 all utilize the same resin. Resin layers 34, if present, are typically the same resin as the layers 30. The resin at least partially surrounds the fibers. The individual fibers and resin are not explicitly shown in the Figures for sake of clarity.

The fibers may be in various forms. The fibers may be at least partially woven, at least partially non-woven, arranged in a single direction or in multiple directions, and may include short fibers and/or long fibers. The fibers may also be referred to the art as reinforcing fibers. The fibers are typically in the form of a cloth, fabric, or mat as understood in the art. The fibers may be arranged in a single ply to define an individual layer 30. Additionally or alternatively, the fibers may be arranged in a plurality of plies or sub-layers that may be laminated together or otherwise attached to define an individual layer 30.

The fibers may be of various chemistries. The fibers may include carbon fibers, boron fibers, glass fibers (i.e., fiberglass), silicon carbide fibers, ceramic fibers, and/or aramid fibers Combinations of different fibers may be also be utilized. Non-limiting examples of suitable particle filler material include talc, calcium carbonate, powdered minerals, mica, cellulose fibers, and glass spheres.

In various embodiments, each of the layers 30 individually comprise at least one of carbon fibers, boron fibers, glass fibers, silicon carbide fibers, ceramic fibers, or aramid fibers, and alternatively at least one of carbon fibers, glass fibers, or aramid fibers. In further embodiments, at least one of the layers 30 comprises glass fibers, alternatively a majority of the layers 30 individually comprise glass fibers, and alternatively all of the layers 30 individually comprise glass fibers.

The layers 30 may each be of various thicknesses. Typically, thickness of the layers 30 is dictated, in part, by form of the fibers. For example, thickness of the layers 30 can be substantially the same as the cloth, fabric, or mat used to form the layers 30. Thickness variations are possible based on resin impregnation and cure of the layers 30.

Optionally, one or more ties (not shown) may be disposed between and/or through the layers 30 to connect two (or more) of the layers 30 together. Utilizing ties can be useful for maintaining orientation of the layers 30 during manufacture and/or use of the composite 20. The ties can be located at various points throughout the composite 20, both laterally and vertically. The ties can he formed from various materials including those described above for the fibers, e.g. glass or carbon fibers.

The intervening-layer 32 comprises a polymeric matrix and layered nanoparticles having a platelet morphology, and thus are referred to herein as layered nanoplatelets 36. As used herein, nanoplatelets are two-dimensional plate-like structures that have a thickness of a few nanometers and aspect ratios ranging from 100 to 3,000 or greater. Non-limiting examples of suitable nanoplatelets include graphene nanoplatelets (also sometimes referred to as graphite nanoplatelets), few-layer graphene/;graphite nanoplatelets, and layered aluminosilicates, also referred to as nanoclays. Any additional intervening-layers 32, if present, also comprise a polymeric matrix and nanoplatelets 36. The polymeric matrix of the individual intervening-layers 32 may be the same as or different from each other. Typically, the intervening-layers 32 all comprise the same polymeric matrix. The platelets 36 are embedded within the polymeric matrix. The polymeric matrix can be considered a carrier of the platelets and thus the layers 32 can also be referred to as carrier layers, regardless of whether they are disposed between additional adjacent layers. It will be understood that there can be intermingling of the carrier material and/or the platelets with adjacent layers of materials depending on the materials used and the methods used in assembling the layers. The polymeric matrix is not explicitly shown in the Figures for sake of clarity.

In various embodiments, the polymeric matrix comprises at least one type of a resin, either a thermoset or a thermoplastic contemplated to be different from the composite. Typically, the resin is a thermoset which is distinguishable from the thermoplastic.

In certain embodiments, the polymeric matrix comprises the resin. In these embodiments, the resin may be the same as or different from the resin utilized for the layers 30. If the same, the resin is typically unitary throughout the composite 30. This often occurs with certain methods of manufacture, such as with resin transfer molding. The resin is typically in a cured or otherwise solidified state, but can be utilized while in an uncured or otherwise liquid state during manufacture of the composite 20. For example, the resin can be utilized while in a liquid (or gel) form to manufacture the composite 20. The resin cures to form the composite 20. in certain embodiments, the fibers are free of resin prior to manufacturing the composite 20, i.e., they are dry. In other embodiments, it is possible that the fibers include some amount of resin prior to manufacturing the composite 20, with such fibers typically referred to in the art as prepregs. If prepregs are used, different combinations of resin in the composite 20 are possible.

Various types of resins can be used to form the layers 30 and, in the aforementioned embodiments, the intervening-layers 32. In certain embodiments, the resin individually comprises at least one of an epoxy resin, a polyester resin, a vinylester resin, or a shape memory polymer (SMP) resin, and alternatively at least one of an epoxy resin or a polyester resin. The resin can include one or more conventional additives, such as a curing catalyst and/or filler. The resin may cure at ambient or room temperature. Optionally, heat may be applied to expedite cure of the resin during manufacture of the composite 20. For example, the composite 20 may be cured in a press, an oven, or an autoclave.

The resin can be used in various amounts. The resin is typically used in an amount sufficient to at least impregnate (or wet out) the fibers during manufacture of the composite 20. Additional resin can he used to finish outer surfaces of the composite 20. For example, additional resin can be used to provide a show surface of the composite 20, if desired. Tool or mold surfaces are often pre-coated with a mold release, gelcoat, resin, and/or other in mold coating (MC) during to lay-up. The amount of resin can be selected based on want or need, and one of skill in the art can readily determine an appropriate amount of resin for the composite 20 via routine experimentation.

In other embodiments, the polymeric matrix comprises a thermoplastic different from the resin. Various types of thermoplastics can be used to form the intervening-layers 32. Blends of thermoplastics may also be used. The amount of thermoplastic can be selected based on want or need, and one of skill in the art can readily determine an appropriate amount of thermoplastic for the composite 20 via routine experimentation. The thermoplastic is typically in a solidified state, but can be utilized while in a molten or otherwise liquid state during manufacture of the composite 20. For example, the thermoplastic can be utilized while molten to manufacture the composite 20. Alternatively, the thermoplastic may be utilized in a solid form, such as a sheet or film, to manufacture the composite 20. It is thought that the embodiments using thermoplastic for the intervening-layers 32 allows for the possibility of repairing the composite 20 after an impact and delamination event.

Figure 8:
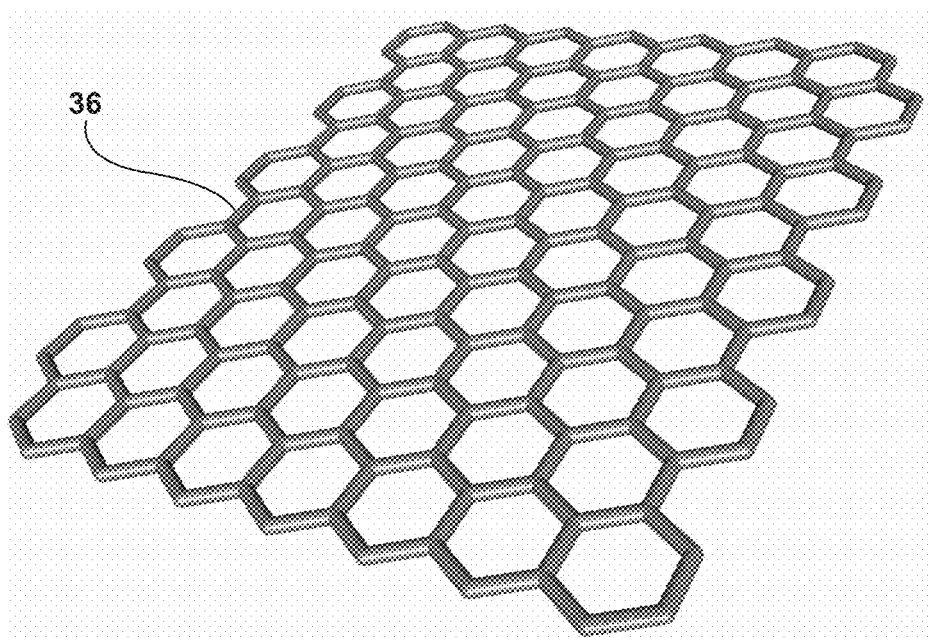
FIG. 8 depicts graphene.
Figure 9:
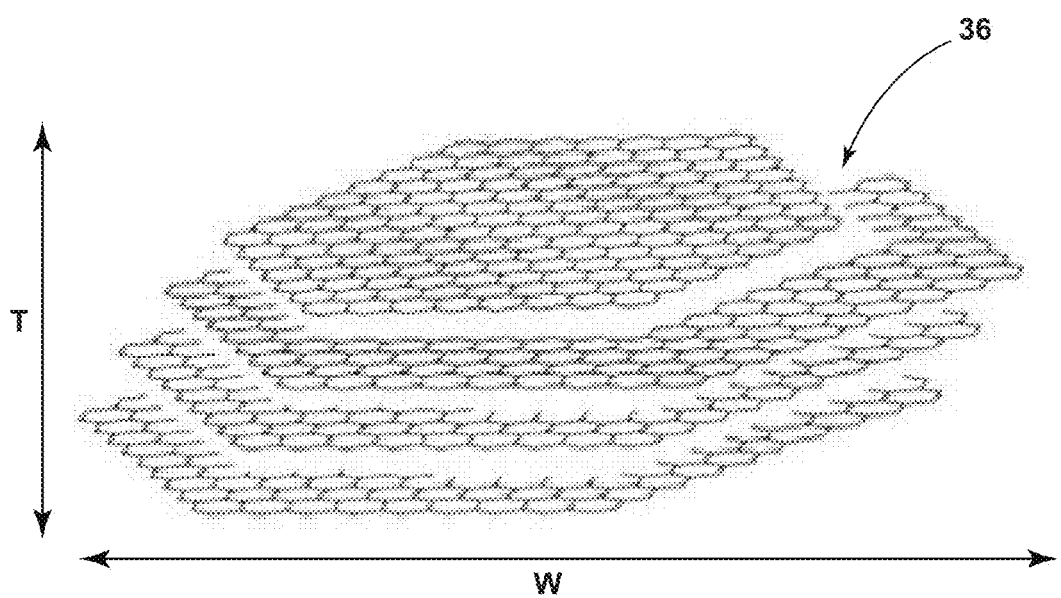
FIG. 9 depicts a graphene nanoplatelet.

In one exemplary embodiment, the nanoplatelets 36 can be in the form of graphene nanoplatelets. As understood by those skilled in the art, graphene may include a single planar sheet of $sp^2$-bonded carbon atoms that are densely packed in a honeycomb crystal lattice. For example, graphene may resemble an atomic-scale chicken wire made of carbon atoms and their bonds, as shown in FIG. 8. The carbon-carbon bond length in graphene is approximately 0.142 nanometers (nm). While perfect graphenes may include only hexagonal cells, imperfections may be introduced to create non-planar shapes. A simplified structure of a graphene nanoplatelet 36 is illustrated in FIG. 9. Grapheme nanoplatelets are understood in the art and typically comprise a stack of one or more graphene sheets having a height less than 100 nm and a width that is greater than its height. Such stacks can include two, three, four, five, or more graphene sheets.

As used herein, the nanoplatelets 36 have a thickness dimension less than 10 nm, e.g. the nanoplatelets 36 have an average thickness less than 10 nm. Typically, the layered nanoplatelets 36 comprise layers of nanosilicate or graphene nanoplatelets.

In various embodiments, the nanoplatelets 36 have an average thickness less than about 10 nanometers, alternatively less than about 75 nanometers, alternatively less than about 50 nanometers, and alternatively less than about 25 nanometers, Further, the nanoplatelets 36 typically have an average width to average thickness ratio (W:T, also referred to as the aspect ratio) of greater than about 100, alternatively greater than about 350, and alternatively greater than about 500. The W:T ratio can be upwards of 1000 or even 2500 or greater. The W:T ratio may also be larger or smaller, and there can be a narrow or wide particle size distribution of various modes among the nanoplatelets 36.

In various embodiments, the nanoplatelets 36 are dispersed in the intervening-layers 32 continuously or discontinuously in multiple aligned planes (or planar fashion). The aligned planes of nanoplatelets 36 are substantially parallel to the layers 30, as shown in FIGS. 3 through 7. The nanoplatelets 36 can be oriented in this manner during manufacture of the composite 20. Orientation of this sort may just occur based on structure or be purposefully imparted, e.g. by an application technique. For example, the nanoplatelets 36 can be oriented by a rheological force imparted to the nanoplatelets 36 as they are brushed, wiped, or otherwise applied onto a substrate. It will be understood that natural variations and/or imperfections may occur such that some minor proportion of the nanoplatelets in each of the intervening-layers 32 is not aligned parallel to the layers 30.

The nanoplatelets 36 in the intervening-layers 32 provide at least some level of controlled or predictable delamination of the composite 20 during an impact. As used herein, delamination refers to a separation of adjacent layers of a composite material. A direct impact is generally perpendicular to the composite 20, whereas a tangential impact is generally any less than perpendicular to the composite 20. A direct impact may also be referred to as a piercing impact. A tangential impact may also be referred to as a glancing impact. Specifically, it is thought that kinetic energy arising from a direct or tangential impact to the composite 20 is at least partially absorbed and redirected laterally along the intervening-layers 32 via the nanoplatelets 36.

Figure 10:
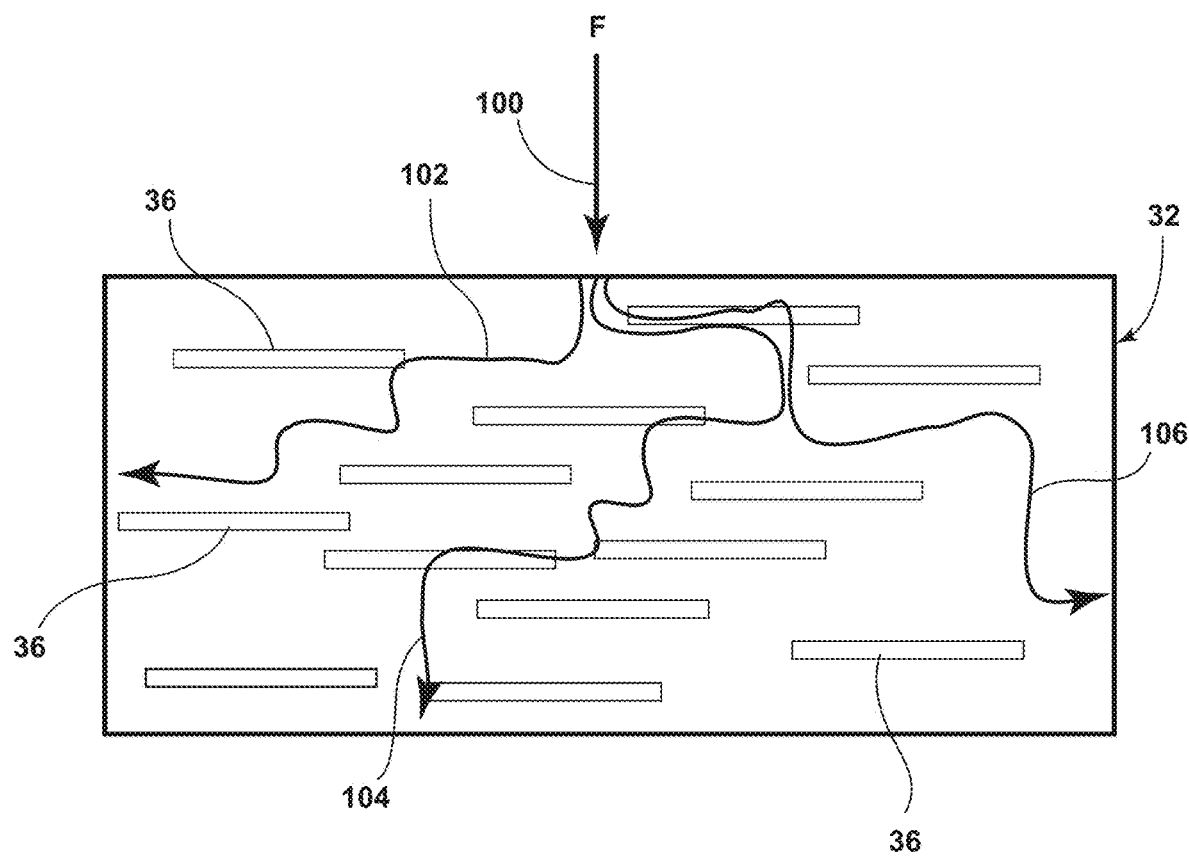
FIG. 10 is a schematic representation of a nanoplatelet-containing layer.

FIG. 10 schematically illustrates the dispersion of energy through an exemplary intervening-layer 32. It will be understood that FIG. 10 is provided for the purposes of discussion only and is not meant to be limiting in any manner. The intervening-layer 32 includes a plurality of nanoplatelets 36 dispersed in multiple layers throughout the intervening-layer 32. An impact force F, as indicated by arrow 100, applied to the intervening-layer 32 transfers kinetic energy to the intervening-layer 32, as indicated by arrows 102, 104, and 106. As illustrated by arrows 102, 104, and 106, the kinetic energy from the force F of the impact propagates through the intervening-layer 32 along the path of least resistance. The size, amount, and distribution of the nanoplatelets 36 are selected so that at least some of the nanoplatelets 36 in the multiple layers within the intervening-layer 32 at least partially overlap. As illustrated schematically, a periphery of some of the nanoplatelets 36 at least partially overlap with a central portion of a nanoplatelets 36 of another layer within the intervening-layer 32. Thus, the kinetic energy 102, 104, 106 is inhibited from traveling in a straight line directly through the intervening-layer 32, but rather is redirected laterally as the energy is dispersed. In this manner, the nanoplatelets 36 create a tortuous path by which the kinetic energy from an impact force F propagates through the intervening-layer 32. The tortuous path of the kinetic energy can be visualized as traveling through the polymeric matrix in the intervening-layer until encountering a nanoplatelet. The kinetic energy is most likely to travel a path of least resistance and thus travels laterally along the central portion of the nanoplatelet to a periphery of the nanoplatelet. Once past the peripheral end of the nanoplatelet, the path of least resistance through the polymeric matrix continues to travel laterally and/or to change direction back to the direction of the impact force until another nanoplatelet is encountered and the process repeats.

The size, amount, and/or the distribution of the nanoplatelets within the intervening-layer 32 is configured to redirect the propagation of kinetic energy multiple times within the intervening-layer 32. In this manner, the loading of the nanoplatelets within a given layer and within the different intervening-layers 32 of the composite, is selected to attenuate a given individual or cumulative impact force. In addition, the stiffness of the matrix within which the nanoplatelets 36 are embedded relative to the nanoplatelets 36 can also be selected to effect the propagation of energy through the intervening-layer 32.

Returning again to the exemplary multilayer composites 20 of FIGS. 3-7, the kinetic energy from an impact force propagates through the first layer 30a and strikes the nanoplatelets 36 in the first intervening-layer 32a, which in turn redirects at least some of the kinetic energy laterally along the intervening-layer 32 rather than allowing all of it to pass through the composite 20, as described above schematically with respect to FIG. 10. This absorption and redirection phenomenon repeats through the second intervening-layer 32b and so on. The amount of kinetic energy may be such that delamination of the composite 20 occurs immediately upon impact or over time when subject to many smaller impacts. In this manner, delamination may be the result of the accumulation over time of a predetermined number of impacts resulting in a cumulative impact force. Delamination of one or more layers 30 of the composite 20 is generally indicative of energy absorption/redirection. Typically, the composite 20 will delaminate via cohesive failure of one or more intervening-layers 32, starting at or around surfaces of the nanoplatelets 36 as they absorb and/or redirect kinetic energy. Adhesive failure within the composite 20 is also possible, but is typically second to cohesive failure. As used herein, cohesive failure refers to failure within the bulk of the intervening-layer 32 whereas adhesive failure refers to failure at the interface between adjacent layers. Each of the one or more intervening layers 32 can be configured to cohesively fail when a predetermined minimum impact force threshold is satisfied such that at least partial delamination of the composite 20 occurs. Satisfying the predetermined impact force threshold can occur when an accumulated impact force or an individual impact force has a magnitude that is equal to or greater than the threshold force. The at least partial delamination of the composite 20 provides an indication that an impact at or above the predetermined force threshold has occurred.

Figure 11:
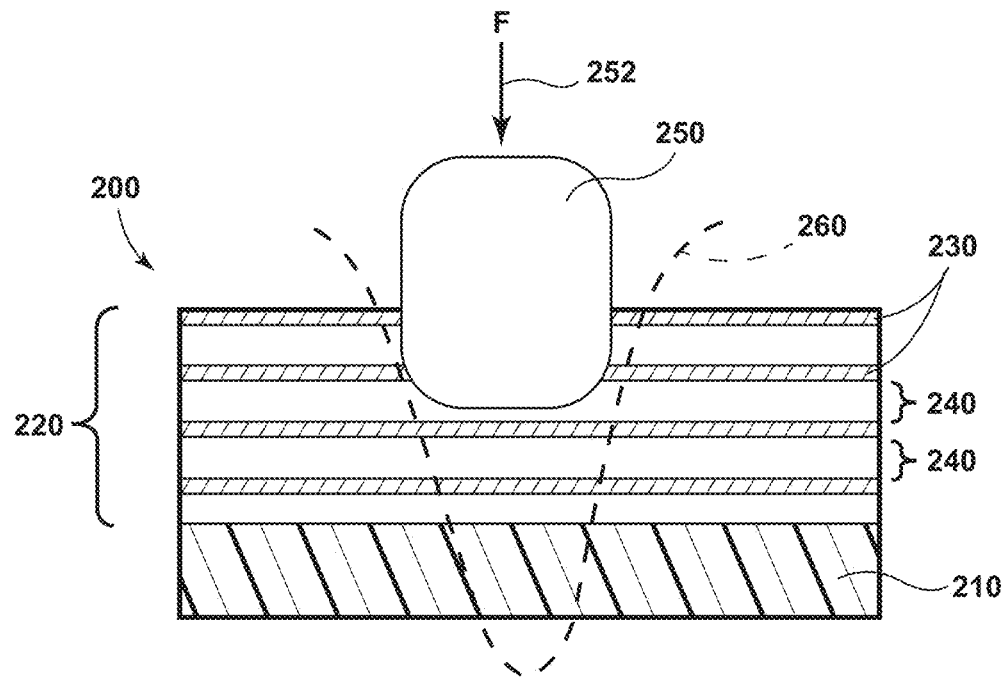
FIG. 11 is a schematic representation of a composite article experiencing an impact force.
Figure 12:
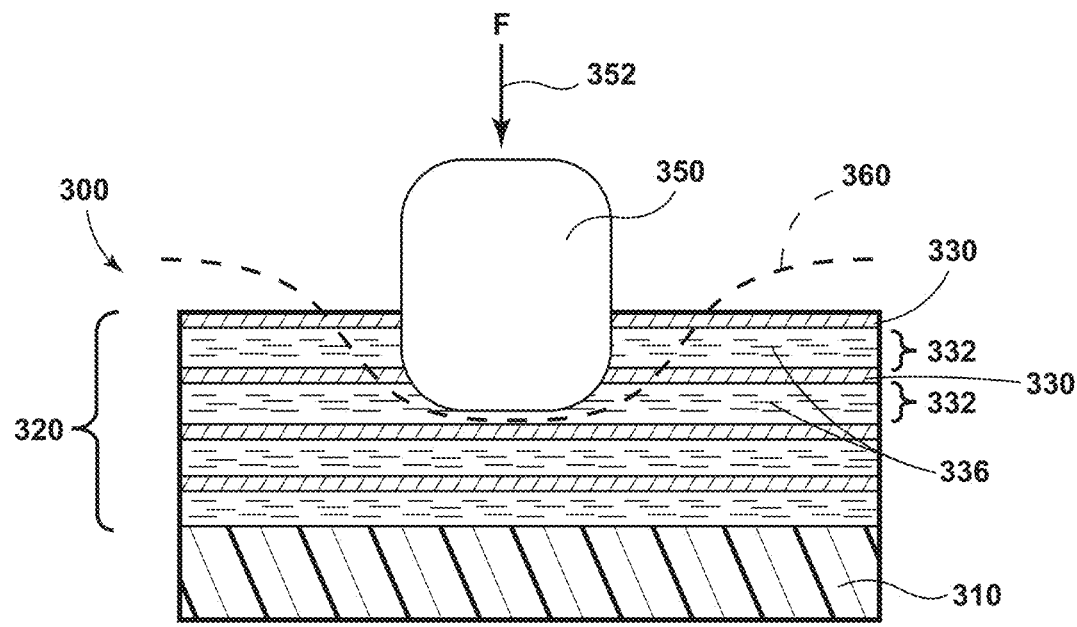
FIG. 12 is a schematic representation of a nanoplatelet-containing composite article experiencing an impact force.

FIGS. 11 and 12 schematically compare the effect of an impact force on a composite 220 that does not include nanoplatelets and a similar composite 320 that does include nanoplatelets. It is understood that the illustrations of FIGS. 11 and 12 are provided for the purposes of discussion only and are not necessarily indicative of actual data. FIG. 11 illustrates an article 200 made from a traditional composite 220 provided on a substrate 210. The composite 220 can be in the form of a laminate comprising multiple filled layers 230, similar to the filled layers 30 of FIGS. 3-7, which alternate with non-filled layers 240. FIG. 12 illustrates an article 300 made from a composite 320 and substrate 310 similar to that of FIG. 11 except that the composite 320 includes intervening-layers 332 containing nanoplatelets 336 as described above with respect to the intervening layers 32 of FIGS. 3-7, alternating with the filled layers 330 instead of the non-filled layers 240.

With reference first to FIG. 11, when an object 250 impacts the composite 220 with a force F in the direction indicated by arrow 252, energy is transferred to the composite 220, which can potentially penetrate into and through the composite 220 and/or substrate 210. The extent to which the force F penetrates and possibly damages the composite 220 and substrate 210 is defined by a cone of influence 260, which varies based on factors such as the size of the impacting object, the force of the impact, and the characteristics of the composite 220 and substrate 210. In the example illustrated in FIG. 11, the cone of influence 260 extends through the composite 220 and substrate 210, which means that the impact extends through the article 200 could be felt by an object being protected by the article 200. In the exemplary embodiment of a football helmet made from the article 200, an impact force that extends through composite 220 and substrate 210 could potentially result in a head injury to the person wearing the helmet.

In contrast, as illustrated in FIG. 12, when the article 300 is impacted by an object 350 having the same characteristics and impact force F of the object 250 of FIG. 11 in the direction illustrated by arrow 352, the cone of influence 360 for the article 300 is significantly different than the cone of influence 260 for the article 200. As described above with reference to FIG. 10, the nanoplatelets 336 in the composite 320 can redirect the propagation of kinetic energy from the force F of the impact laterally through the intervening-layers 332, which can decrease the extent to which the cone of influence 360 extends through the article 300. Thus, for a given impact force, the nanoplatelet containing composite 320 reduces or even eliminates penetration of energy to and damage to the substrate 310 compared to the composite 220, which does not include nanoplatelets.

The nanoplatelets 36 are present in the intervening-layers 32 in various amounts. In various embodiments, the nanoplatelets 36 are present in the intervening-layers 32 in an individual amount of no greater than about 10, alternatively no greater than about 5, and alternatively of from about 0.1 to about 5, pbw, based on 100 pbw of the intervening-layer 32.

Referring again to FIGS. 4 through 7, the nanoplatelets 36 can be allocated in the same or differing amounts in the various intervening-layers 32. For example, the nanoplatelets 36 are present in the second intervening-layer 32b in an amount about the same as or different from the first intervening-layer 32a. The nanoplatelets 36 are present in the third intervening-layer 32c in an amount about the same as or different from the first intervening-layer 32a. Further, the nanoplatelets 36 are present in the third intervening-layer 32c in an amount the same as or different from the second intervening-layer 32b, and so on.

Overall, different loading gradients of the nanoplatelets 36 are used in the composite 20. For example, in FIG. 4, each of the intervening-layers 32 has about the same amount of nanoplatelets 36, e.g. ~2 wt. %, whereas the composite 20 in FIG. 5 has a gradient of nanoplatelets 36, e.g. ~4 wt %, ~2 wt. %, and ~1 wt. %. The composite 20 in FIG. 6 has a symmetric gradient of nanoplatelets 36, e.g. ~4 wt. %, ~2 wt. %, ~1 wt. %, ~2 wt. %, and ~4 wt. %.

The composite in FIG. 7 also has a symmetric gradient of nanoplatelets 36, e.g. ~2 wt. %, ~1 wt. %, and ~2 wt. %, in addition to the resin layers 34. Layers 30e and 30f may be KEVLAR®, for example, while layers 30a through 30d may be fiberglass. Alternatively, all of the layers 30 are the same, e.g. fiberglass. While not shown, inverse gradients of nanoplatelets 36 are also possible, which have a higher amount of loading in the middlemost relative to the outermost intervening-layers 32 of the composite 20. It is also contemplated to have lateral gradients of nanoplatelets 36 in one or more of the intervening-layers 32 (not shown). In view of the foregoing, it is to be appreciated that various configurations and combinations are possible, and the disclosure is not limited to just those expressly described or illustrated herein.

Figure 4:
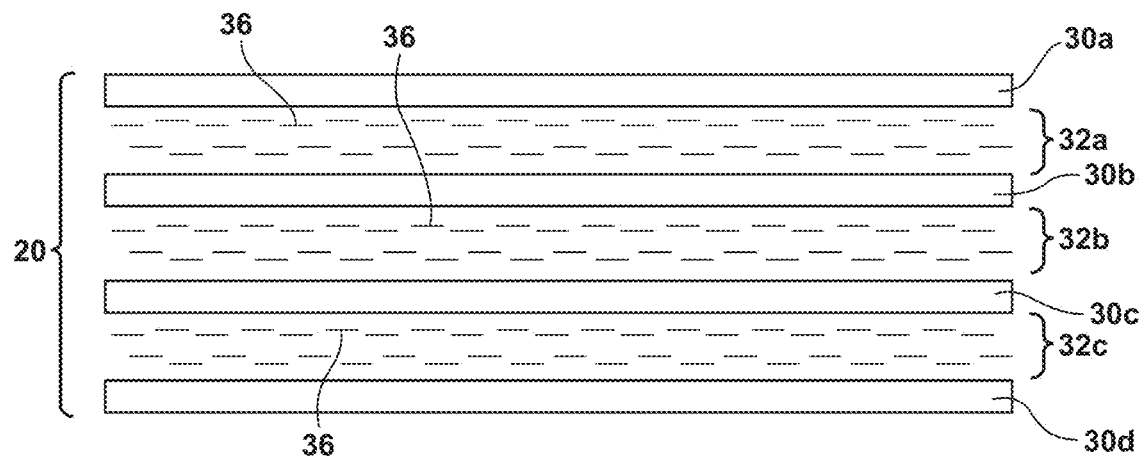
FIG. 4 is an exploded side view of an embodiment of the composite article.

It is thought that manipulating the amount/loading of the nanoplatelets 36 in the intervening-layers 32 allows for the composite 20 to be tailored to fail in a predictable manner upon impact, e.g. by partially to completely delaminating along at least one of the intervening-layers 32. It is also thought that likelihood of failure increases with increased amount of the nanoplatelets 36 in the intervening-layers 32. This is not bad, but rather by design, as delamination or cohesive failure of one or more of the intervening-layers 32 is indicative of a redirection of kinetic energy laterally along the intervening-layers 32 rather than allowing kinetic energy to pierce into the composite 20 (therefore being transferred to an individual or occupant underneath). For example, each of the intervening-layers 32 can have the same nanoplatelet loading, as illustrated in FIG. 4, such that each of the intervening layers 32 fail at the same impact force threshold.

Figure 5:
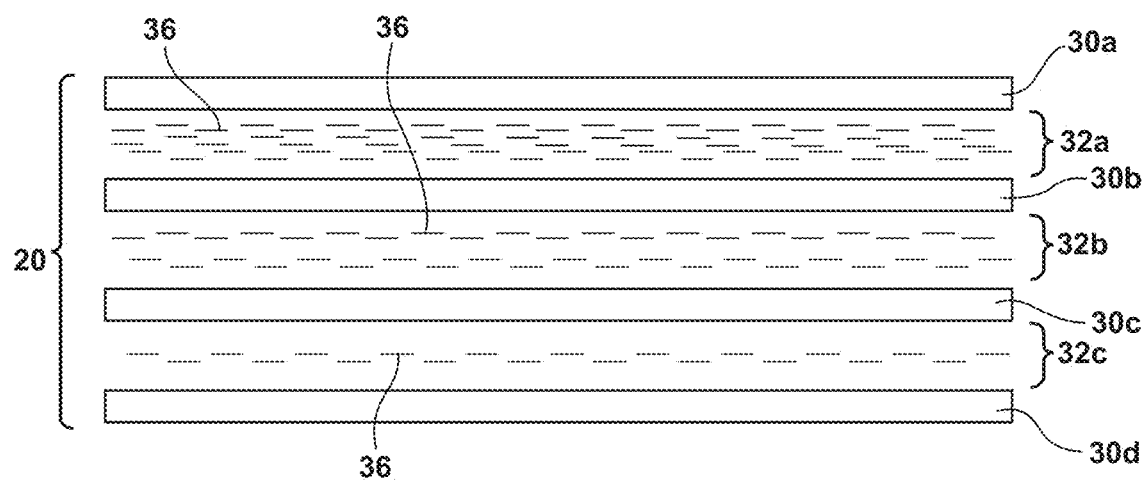
FIG. 5 is an exploded side view of a further embodiment of the composite article.

Alternatively, the nanoplatelet loading can decrease from an exterior layer of the composite 20 toward an interior layer, such as illustrated in FIG. 5, such that the outer intervening-layers 32 fail by delamination first.

Additional characteristics, such as the aspect ratio of the nanoplatelets 36, can also be selected to configure the composite 20 such that it fails by delamination in a predictable manner. In general, nanoplatelets 36 having a high aspect ratio facilitate laterally deflecting kinetic energy within the intervening-layer 32 better than nanoplatelets 36 having a small aspect ratio, which increases the amount of kinetic energy dissipated by the layer. In addition, an intervening-layer 32 having high aspect ratio nanoplatelets 36 is more likely to fail by delamination than a similar intervening-layer 32 having small aspect ratio nanoplatelets 36 within the range of forces of interest. Thus, the aspect ratio of the nanoplatelets 36 in each of the intervening-layers 32 is selected to provide a desired amount of kinetic energy deflection and/or to control the delamination of each of the intervening-layers 32.

As such, the amount of kinetic energy, and thus the impact force, experienced by an individual utilizing the composite 20 is generally reduced. Without being limited to any particular theory, it is thought that the composite 20 of this disclosure generally reduces kinetic energy by at least about 5%, alternatively at least about 10%, alternatively at least about 20%, alternatively at least about 30%, alternatively at least about 40%. It is to be appreciated energy reduction may not occur in all instances, as impact events are random and unpredictable in nature.

The intervening-layers 32 may each be of various thicknesses. Typically, thickness of the intervening-layers 32 is controlled, in part, by the amount of nanoplatelets 36 present in the intervening-layer 32 and the manufacturing technique used. In certain embodiments, the intervening-layers 32 have an individual average thickness of no greater than about 2.5, alternatively no greater than about 0.25, alternatively of from about 0.025 to about 0.25, millimeters (mm).

Typically, at least one of the layers 30 is free of the nanoplatelets 36, alternatively a majority of the layers 30 are free of the nanoplatelets 36, and alternatively all of the layers 30 are free of the nanoplatelets 36. Quite simply, the nanoplatelets 36 are generally present in the intervening-layers 32 only and are not generally present in the layers 30. It is thought that this aspect of the composite 20 allows for better predictability or control of delamination.

Method

Various types of methods that are utilized to form conventional composite materials can also be used to make the composite 20 of this disclosure. Examples of such methods include, but are not limited to, hand lay-up, spray lay-up, pressure (or vacuum) bag molding, bladder molding, pressure press molding, autoclave molding, thermoforming, thermo-hydroforming, resin transfer molding (RTM), and combinations thereof. In various embodiments, the composite 20 is formed via RTM. In other embodiments, the composite is formed via vacuum bag molding with optional press, oven, and/or autoclave cure. These methods are understood by those of ordinary skill in the art.

In certain embodiments, the composite 20 is generally made by the following exemplary method. The method comprises the step of I) providing substrate pieces, resin, nanoplatelets, and a tool surface. The substrate pieces individually having front and rear sides. The substrate pieces comprise the fibers as described above, and can be, for example, pieces of a fabric, sheet, or mat. The resin and nanoplatelets are also as described above. The tool surface can be of any type, and can be formed from various materials. The tool may also be referred to in the art as a mold or a mandrel.

The method further comprises the step of II) disposing a substrate piece on the tool surface such that the rear side of the substrate piece is opposite the tool surface. The substrate piece may be disposed by automation or by hand. Optionally, the tool surface may be prepped prior to disposing the substrate piece. For example, a mold release, gelcoat, resin, and/or other IMC may be applied to the tool surface to prevent sticking of the composite 20 and/or to provide a show surface of the composite 20.

The method further comprises the step of III) applying the nanoplatelets to the rear side of the substrate piece to form a coated side. The nanoplatelets can be applied in various ways. In certain embodiments, the nanoplatelets are provided as a solution. The solution comprises a solvent and the nanoplatelets.

As such, III) applying the nanoplatelets may be defined as III) applying the solution. The solution can be applied in various ways. In various embodiments, the solution is applied by at least one of a brush, a roller, a sprayer, or an inkjet head. in specific embodiments, the solution is applied by brush, which is useful for orienting the nanoplatelets on the rear side of the substrate piece. In addition, the nanoplatelets may be compounded into a thermoplastic film which can be laminated onto or between layers.

The nanoplatelets can be present in the solution in various amounts. In certain embodiments, the nanoplatelets are present in an amount of no greater than about 10, alternatively no greater than about 5, and alternatively of from about 0.1 to about 5, parts by weight (pbw), based on 100 pbw of the solution. Various types of solvents can be used, such as an alcohol. The solvent is typically of the type that can easily be flashed off in ambient or raised temperatures. This prevents the solvent from remaining and potentially interfering with the remainder of the composite 20 during manufacture or use.

In certain embodiments, at least a portion of resin is applied to the substrate piece prior to III) applying the nanoplatelets. The resin can be applied to the substrate piece in various ways, including those described above for the solution, or in ways associated with other methods of manufacture. Additionally or alternatively, the resin may have previously been applied such that one or more of the substrate pieces are prepregs.

The method further comprises the step of IV) disposing a subsequent substrate piece onto the coated side of the substrate piece to form a laminate. The laminate has layers comprising the substrate pieces and an intervening-layer comprising the nanoplatelets. The laminate may or may not yet include resin. If the solution is used, the method typically further comprises the step of substantially flashing the solvent from the coated side of the substrate piece prior to IV) disposing the subsequent substrate piece. Flashing of the solvent can occur with ambient conditions and/or be expedited with application of heat.

Steps III) and IV) can be repeated for any additional layer(s) and/or intervening-layer(s) of the laminate. For example, the composite 20 shown in FIG. 4 can have steps III) and IV) repeated twice to impart the third and fourth layers 30, and the second and third intervening-layers 32. Likewise, the composite 20 shown in FIG. 6 can have steps III) and IV) repeated four times.

The method further comprises the step of V) applying resin to the substrate pieces and/or the laminate to form a preform. The resin can be applied to the substrate pieces in various ways, including those described above for the solution, or in ways associated with other methods of manufacture. For example, the resin may be applied by a brush or roller. Additionally or alternatively, the resin may be applied to the laminate via RTM.

The method further comprises the step of VI) curing the preform to make the composite article 20. The preform can be cured in various ways. For example, ambient conditions may be sufficient to cure the preform to make the composite 20. Typically, to expedite cure of the resin, at least one of heat and/or pressure is applied to the preform during VI) curing. Application of heat and/or pressure can be achieved by various means understood in the art, such as those associated with pressure (or vacuum) bag molding, bladder molding, pressure press molding, autoclave molding, or resin transfer molding (RTM).

In various embodiments, the method further comprises the steps of providing a thermoplastic different from the resin and disposing the thermoplastic between the substrate pieces prior to VI) curing the preform. The thermoplastic may be in liquid, i.e., molten, or solid form if liquid, the thermoplastic may be applied in various ways, including those described above for the solution, as well as via other ways, such as via extrusion, sheeting, etc. The thermoplastic may also be solid, such as in the form of a sheet or film.

In certain embodiments, the nanoplatelets are applied to the rear side of the substrate piece via the thermoplastic. Specifically, the nanoplatelets can be applied via the thermoplastic prior to III) applying the nanoplatelets to the rear side of the substrate piece. In this way, the thermoplastic can act as a liquid or solid carrier of the nanoplatelets. For example, the thermoplastic can be molten and the nanoplatelets can be dispersed therein to form a mixture. The mixture can then be applied to the rear side of the substrate piece. As another example, the thermoplastic can be solid, e.g. a sheet, and the nanoplatelets can be applied to the sheet, e.g. alone or while in solution. These embodiments may be useful in instances where tailored laying of the composite 20 is desired with the option of repair after a delamination event.

In certain embodiments, at least a portion of resin is applied to the subsequent substrate piece prior to forming the preform. The resin can be applied to the subsequent substrate piece in various ways, including those described above for the solution, or in ways associated with other methods of manufacture. Additionally or alternatively, the resin may have previously been applied such that one or more of the subsequent substrate pieces are prepregs.

In addition to the various statements above, the following statements are intended to further illustrate and not to limit the invention. In addition, the statements herein should not be taken as a guarantee that the likelihood of injury to users of, or individuals associated with, the composite 20 is obviated, reduced, or otherwise prevented in any way.

EXAMPLES

The effect of graphene nanoplatelets on the energy dissipating characteristics of a composite material was investigated using impact tests conducted on flat plaque samples according to a modified version of ASTM International standard D7136/D7136M. The impact tests were conducted on flat plaques consisting of: (a) a composite containing 4 plies of a graphene nanoplatelet-coated glass fiber laminate bonded to a polycarbonate substrate, (b) a composite containing 4 plies of a glass fiber laminate without graphene nanoplatelets bonded to a polycarbonate substrate, and (c) a polycarbonate body.

The samples were prepared by cutting glass fiber swatches to size and recording the weight of each swatch. For the preparation of the graphene nanoplatelet composite, the surface of the glass fiber swatches was prepped with an acetone rinse followed by the application of a coating of graphene nanoplatelets in acetone using a paint brush. The graphene nanoplatelet coated samples were placed in an oven at 60 degrees Celsius to flash the solvent. The coated samples were removed from the oven, allowed to cool, and then weighed to determine the graphene nanoplatelet loading. Samples were prepared having a graphene nanoplatelet loading of 2.5 and 5 percent by weight (wt. %). The coated fiber swatches were applied to a polycarbonate base through hand layup using SC15 resin, a two part epoxy resin available from Applied Poleramic Inc., USA, and then cured. The coated fiber swatches were layered such that the graphene nanoplatelet-coated side faced toward the polycarbonate substrate. The final graphene nanoplatelet composite sample consisted of 4 plies of coated glass fiber swatches on a polycarbonate base. For comparison, a glass fiber composite sample was prepared in the same way, except that the graphene nanoplatelet coating step was skipped.

The samples were tested in a manner similar to that described in ASTM International standard D7136/D7136M, except that a 2 inch diameter indenter was used instead of the 0.625 inch indenter called for in the standard. The larger diameter indenter was selected to more accurately reflect the impact of an object closer to the scale of what an athlete might experience in a football game. The samples were tested at 67 Joules (~2.3 m/s) and 133 Joules (~3.5 m/s).

Figure 13A:
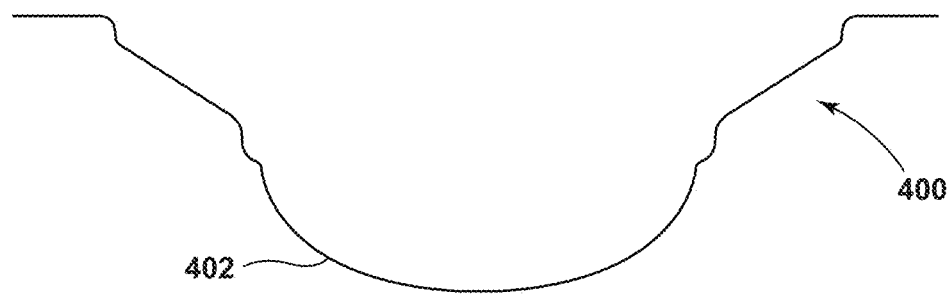
FIGS. 13A-C are a schematic representation of the results of impact tests on a exemplary graphene nanoplatelet-containing composite article and comparative articles.
Figure 13B:
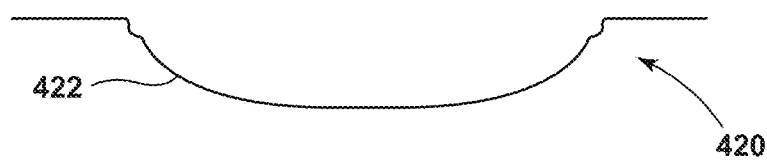
Figure 13C:

Each sample was visually inspected following impact with the indenter to determine the extent of deformation exhibited by the polycarbonate substrate. Under both conditions, the graphene nanoplatelet composite samples at both loading weights exhibited less deformation than the composite samples without graphene nanoplatelets and the polycarbonate substrate alone. FIGS. 13A-C schematically illustrate the differences between the polycarbonate substrate alone, the composite sample with graphene nanoplatelets, and the graphene nanoplatelet-containing composite sample, respectively. As can be seen in FIG. 13A, for a sample 400 consisting of the polycarbonate substrate alone, severe deformation was observed with a "bowl" shaped indentation 402 at 133 Joules. The glass fiber composite sample without graphene nanoplatelets 420 exhibited some deformation 422 at 133 Joules (FIG. 13B), albeit significantly less than exhibited by the polycarbonate substrate alone. Unexpectedly, as illustrated in FIG. 13C, the graphene nanoplatelet-containing composite sample 430 exhibited the least amount of deformation 432, which was barely visible on the surface of the composite. The results of the flat plaque impact tests illustrate the ability of graphene nanoplatelet-containing composites to dissipate impact energy laterally while also protecting the underlying substrate, in this case the polycarbonate substrate.

Figure 14:
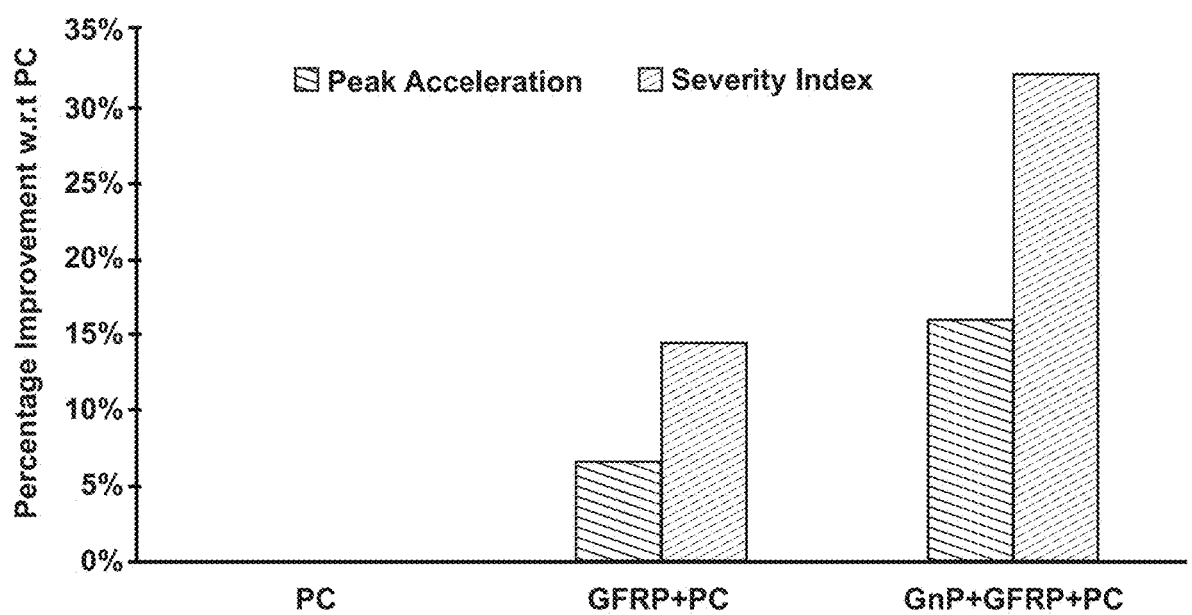
FIG. 14 is a graph that illustrates the peak acceleration and severity index for an exemplary graphene nanoplatelet-containing composite article and comparative articles.

FIG. 14 illustrates results comparing the effect of graphene nanoplatelet layers on the peak acceleration and severity index (SI) measured in helmet drop tests. The drop tests were conducted on helmets consisting of: (a) a composite containing 4 plies of a graphene nanoplatelet-coated glass fiber laminate bonded to a polycarbonate substrate ("GnP+GFRP+PC"), (b) a composite containing 4 plies of a glass fiber laminate without graphene nanoplatelets bonded to a polycarbonate substrate ("GFRP+PC"), and (c) a polycarbonate body ("PC").

Each sample helmet tested consisted of a polycarbonate body formed into the general shape of a football helmet.

Glass fiber swatches were pre-cut to allow molding onto the polycarbonate helmet body. The composites with and without graphene nanoplatelets were prepared using the pre-cut swatches in the same manner as described above for the flat plaque tests. The glass fiber swatches with and without a graphene nanoplatelet coating were applied to the polycarbonate helmet body through a hand layup process using SC15 resin, a two part epoxy resin available from Applied Poleramic Inc., USA, and then cured. The graphene nanoplatelet loading in the intervening-layers for the graphene nanoplatelet test helmet was 1.5 wt. %.

The helmet drop tests were conducted according to standard (ND) 001-13m13 of the National Operating Committee on Standards for Athletic Equipment (NOCSAE). Each helmet was dropped three times from a drop height of 4.5 feet above the anvil, with the hit occurring at the front boss location. Data during the drop test was gathered using a tri-axial accelerometer and the peak acceleration and severity index (SI) was calculated according to NOCSAE recommendations for 1 representative run for each helmet tested. Per NOCSAE recommendations, data beyond the first peak (~5 ms) was ignored.

Per NOCSAE standard (ND) 001-13m13, the severity index (SI) is a measure of the severity of impact with respect to instantaneous acceleration experienced by the headform as it is impacted. Acceptable severity index levels measured during impact cannot exceed the limit specified in the NOCSAE standard performance specification. The severity index is defined as the integration of $A^{2.5}$ over the essential duration T of the acceleration pulse in time increments of seconds. A is defined as the instantaneous resultant acceleration expressed as a multiple of g (acceleration of gravity). For purposes of electronic data gathering, the integration begins after the system triggers but before the initial signal rises above 4 g's; the integration ends when the signal falls below 4 g's after it has peaked.

The peak acceleration data and severity index (SI) were calculated for each of the helmets tested: polycarbonate body alone (PC), graphene nanoplatelet containing laminate helmet (GnP+GFRP+PC), and the laminated helmet without graphene nanoplatelets (GFRP+PC). The data was normalized with respect to the polycarbonate helmet (PC) and then expressed as a percent improvement compared to the polycarbonate helmet (PC). As illustrated in FIG. 15, the graphene nanoplatelet containing laminate improved the peak acceleration by greater than 15% and the severity index (SI) by greater than 30% compared to a simple polycarbonate body. The percent improvement for the peak acceleration and severity index (SI) of the graphene nanoplatelet helmet (GnP+GFRP+PC) was more than double the percent improvement seen with the laminate that did not include graphene nanoplatelets (GFRP+PC).

INDUSTRIAL APPLICABILITY AND ADVANTAGES

The composite 20 is useful for controlling direction of kinetic energy, i.e., lateral vs. penetration. The nanoplatelets 36 are useful for invoking a failure mechanism, e.g. delamination, to make the composite 20 behave in a predictable manner upon impact. In embodiments utilizing thermoplastic for the intervening-layers 32, the composite 20 may be repaired or healed by re-melting the thermoplastic to correct any cohesive (or adhesive) failure associated with the intervening-layers 32. The graphene nanoplatelets generally react with microwaves, and can act as thermal sinks for localized melting of the thermoplastic. This allows for controlled and quick repair of the composite 20 without damaging or impeding other portions of the composite 20. For example, the composite 20 may be repaired on the sidelines of a sports field after a delamination event.

As introduced above, the composite 20 can be added as an outer layer to existing helmets, or to new helmets. The composite 20 generally allows a helmet 22 to take multiple impacts/hits, can divert energy away from an individual's skull (e.g. to reduce the likelihood of a concussion), may prevent projectile penetration, and can be repairable/re-healable (especially for low velocity impacts).

Increasing the energy absorption/diversion in existing and new helmets via the composite 20 of this disclosure has immediate use in the sports industry market. In addition, the potential for preventing projectile penetration also has a wide range of applications for defense applications. Further, many of the conventional helmets are replaced after one impact event/hit, as structural integrity is left in question. Various embodiments of the composite 20 herein allows for repair thereby allowing the helmet 22 to be used multiple times. The same helmet 22 may be repaired multiple times for low-velocity impact/hits. The composite 20 can be used with other types of protective body gear in a manner similar to that described above for the helmet 22, non-limiting examples of which include protective vests, chest guards, face shields, leg guards, and protective eyewear.

The composite 20 is not limited to helmets, but may be utilized in a variety of applications in which dissipation of impact energy is desired. Non-limiting examples of alternative applications include protective body gear for athletic, military, security, or medical reasons, footwear, vehicle components, and construction elements (e.g. interior or exterior walls and partitions).

It is to he understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, Which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

What is claimed is:

1. A multilayer composite comprising:
    a plurality of adjacent filler layers comprising a filler material dispersed within a first polymeric matrix, the filler material comprising fibers;
    a plurality of at least three intervening-layers disposed between the adjacent filler layers, said intervening-layers each comprising nanoplatelets dispersed within a second polymeric matrix, wherein at least one of the plurality of intervening-layers is disposed between each pair of the adjacent filler layers; and
    a thermoplastic or metal shell substrate;
    wherein the adjacent filler layers and the intervening-layers are disposed on a surface of the thermoplastic or metal shell substrate;
    wherein said nanoplatelets are aligned substantially parallel to the adjacent filler layers,
    wherein said nanoplatelets include a central portion and a periphery, and the nanoplatelets are oriented in a first layer and a second layer, wherein the second layer is disposed in a generally parallel relationship with the first layer, and the first and second layers are oriented in an overlapping relationship such that the periphery of the nanoplatelets in the first layer overlap the central portion of the nanoplatelets in the second layer,
    wherein upon application of a force to the multilayer composite impacting the central portion of the nanoplatelets in the first layer, the intervening-layers are configured to deflect the force to the central portion of the nanoplatelets in the second layer, thereby at least partially absorbing and laterally redirecting kinetic energy arising from the impact, wherein the intervening-layers are configured to fail upon application of a force to the multilayer composite that is greater than or equal to a predetermined force threshold, said failure inducing at least partial delamination of the multilayer composite,
    wherein at least one of the plurality of at least three intervening-layers is configured to fail at a different predetermined force threshold than each of the other intervening-layers in the plurality of at least three intervening-layers, and
    wherein an amount of nanoplatelets in each of the the plurality of at least three intervening-layers is different than the amount of nanoplatelets in each of the other intervening-layers in the plurality of at least three intervening-layers, such that the plurality of at least three intervening-layers has a nanoplatelet gradient in which nanoplatelet loading amount decreases from an exterior intervening-layer toward an interior intervening-layer nearer to the thermoplastic or metal shell substrate.

2. The multilayer composite as set forth in claim 1 wherein all of said plurality of adjacent filler layers are free of said nanoplatelets.

3. The multilayer composite as set forth in claim 1 wherein said nanoplatelets have an average thickness of less than 10 nanometers and an average aspect ratio of at least 100.

4. The multilayer composite as set forth in claim 1 wherein said nanoplatelets are present in the intervening-layers within a range of 0.1 to 10 parts by weight.

5. The multilayer composite as set forth in claim 1 wherein the intervening-layers have a thickness within a range of 0.025 to 2.5 millimeters.

6. The multilayer composite as set forth in claim 1 wherein the filler material comprises at least one of carbon fibers, boron fibers, glass fibers, silicon carbide fibers, ceramic fibers, aramid fibers, and cellulose fibers.

7. The multilayer composite as set forth in claim 1 wherein the first polymeric matrix and the second polymeric matrix comprise a thermoplastic or thermoset resin.

8. The multilayer composite as set forth in claim 7 wherein the first polymeric matrix is different than the second polymeric matrix.

9. The multilayer composite as set forth in claim 1 wherein the first polymeric matrix and the second polymeric matrix each comprise a thermoplastic.

10. The multilayer composite as set forth in claim 1 wherein at least one of the first polymeric matrix and the second polymeric matrix comprise a thermoplastic.

11. The multilayer composite as set forth in claim 1 wherein the nanoplatelets are selected from the group consisting of graphene nanoplatelets, graphite nanoplatelets, few-layer graphite nanoplatelets, few-layer graphene nanoplatelets, layered aluminosilicates, and nanoclays.

12. The multilayer composite as set forth in claim 1 wherein the nanoplatelets are selected from the group consisting of graphene nanoplatelets, graphite nanoplatelets, few-layer graphite nanoplatelets, and few-layer graphene nanoplatelets.

13. The multilayer composite as set forth in claim 1, wherein each of the plurality of at least three intervening-layers is in direct contact with the adjacent filler layers.

14. A method of deflecting force translated to an article through an impact, comprising the steps of:
    providing the multilayer composite as set forth in claim 1; and
    deflecting a force impacting the central portion of the nanoplatelets in the first layer to the central portion of the nanoplatelets in the second layer, thereby creating a tortuous path for the force translating through the article generated by the impact.

15. The method set forth in claim 14, wherein the plurality of at least three intervening-layers includes decreasing amounts of nanoplatelets disposed therein in a direction extending away from the force generated by the impact.

16. The method set forth in claim 14, wherein the plurality of at least three intervening-layers at least partially delaminates upon the deflecting of the force impacting the article.

17. The method set forth in claim 14, wherein the nanoplatelets are oriented with rheological force.

18. The method set forth in claim 14, wherein the plurality of at least three intervening-layers absorbs force translated to the article from the impact.

19. The method set forth in claim 14, wherein the nanoplatelets have an average aspect ratio of at least 100.

20. The method as set forth in claim 14, wherein the nanoplatelets are selected from the group consisting of graphene nanoplatelets, graphite nanoplatelets, few-layer graphite nanoplatelets, few-layer graphene nanoplatelets, layered aluminosilicates, and nanoclays.

* * * * *